Patented July 13, 1926.

1,592,598

UNITED STATES PATENT OFFICE.

CHARLES B. DAVIS, OF NEW YORK, N. Y.

METHOD OF PURIFYING CARBOHYDRATE SOLUTIONS, ETC.

No Drawing.   Application filed February 26, 1923.   Serial No. 621,471.

In a broad sense, my present invention relates to the purification and refining of carbo-hydrate solutions generally, and particularly those containing saccharine, or starch, gums, fruit pulp, etc., by the elimination therefrom of coloring and other deleterious matter in a simple, inexpensive manner, so as to attain a clarified product at a nominal cost as compared with the processes known in the prior state of the art.

Thus, while my improvements may be said to appertain more particularly to the refining of raw sugar, although not necessarily limited thereto, I herein, by way of exemplification, describe a practical embodiment and utilization of the essential features of my invention for the purpose of effecting the clarification of saccharine solutions, a distinctive feature of my new method of treatment consisting, primarily, in passing a suitably attenuated sugar solution directly through a bone char filter, the extent of dilution being sufficient to precipitate the impurities, so that in passing through the char the sugar syrup is hereby freed therefrom; and secondarily, in utilizing the clarified syrup thus attained as a vehicle for the conveyance of additional raw sugar through the bone-char,—this process of increasing the density of, and utilizing the clarified syrup as, a vehicle for fresh raw material being susceptible of repetition if desirable, substantially as and for the purposes hereinafter fully set forth.

In order to make clear the character and import of my invention a reference to the prior state of the art is expedient. Thus, heretofore, for instance, in the practical refining of raw sugar, say, of 95% purity, the crystals have been made into a magma with low purity yellow syrup, of about 40° Baumé and 95½% purity, and the mass "spun out" in a centrifugal machine, the resultant brown colored syrup being repeatedly used thus as a wash medium until it is almost black, and its purity lowered to about 72%.

This old method yields (1) washed sugar crystals of about 99% purity 52.3° Baumé, left in the centrifugal, and (2) wash liquor of about 72% purity and 42° Baumé.

(1) The washed sugar is dissolved in water to a density of about 32° Baumé, and treated with lime and phosphoric acid to "defecate" or remove deleterious matters suspended in the syrup; a little kieselguhr being then added, and the whole passed through a filter-press or bag filter. The press liquor thus attained is then passed through the bone-char filter for the purpose of decolorization, and then boiled in vacuum pans to a magma of crystals and syrup, which magma is again spun out in a centrifugal machine, which treatment results in a damp granulated sugar, which is dried and sifted, and also in a low purity yellow syrup of about 40° Baumé, as mentioned above, which may be used for washing another batch of raw sugar.

(2) The wash liquor of 72% purity above referred to is mixed with some syrup of 95% purity, and the whole boiled in vacuum until a grain is attained by concentration, forming crystals. The magma thus attained is spun out in the centrifugal and results in:—

(A) Remelt sugar which is treated the same as the original raw sugar before mentioned;

(B) Black syrup of about 50% purity, which is boiled with some syrup of 95% purity to form a crystal grain, the magma thus attained being spun in centrifugal to separate the syrup.

This again results in (1) another remelt which is treated the same as the former one, (that is, as though it were raw sugar); and (2) black syrup of about 44% purity, which is placed in a slow-revolving crystallizer for a few days and again spun out in centrifugal, which yields still another remelt, consisting of the residue in the centrifugal to be treated as raw sugar, and also the final syrup known as "blackstrap." The latter amounts to from 5 to 10 gallons per ton of the original raw sugar, and contains over 50% of sugar which is unrecoverable on account of the excess of impurities contained therein.

It will thus be seen that the old method of refining raw sugar involves many "remelts" in addition to that of the original raw sugar, which all require washing and further treatment, such as vacuum boiling, etc.; also that there are many resultant syrups of low purity carrying various coloring matters, including yellow coloring of high tinctorial power to be cared for, as well as the final "blackstrap", which latter syrup is practically a total loss, it being at times impossible to dispose of it at any price.

As compared with this old method of refining, I greatly simplify and cheapen sugar production by my new process, in which the raw sugar is subjected to a washing with a relatively small amount of water, this washing affording, say, a 36° Baumé solution of dark concentrated syrup, which is diluted to a density of about 10° Baumé, and then forthwith passed through a bone-char filter, from which it runs water-white because of such dilution, which insures the rapid passage of the syrup through the char, while the latter retains the matter previously held in suspension in said solution,—experimental investigation on my part having disclosed the fact that by suitable dilution of the wash liquid the syrup may be separated from its impurities by the char.

It will thus be readily understood that by this means I obviate the production of, or necessity for, remelt sugars, and that "blackstrap" is eliminated as a final resultant; that no defecation with lime or or phosphoric acid is necessary; that the major part of the yellow coloring matter is eliminated by simple filtration, whereby I attain (1) a dilute water-white sugar solution or syrup, and (2) washed sugar crystals. This water-white sugar solution (1) is used to dissolve the washed sugar crystals, and the resultant syrup, of about 10° concentrated to 30° Baumé passed through the bone-char, and the final white liquor thus grained in a vacuum pan. The magma from the vacuum pan is spun in a centrifugal, yielding white granulated sugar and a straw or golden colored syrup.

Advantages attained by my new method of treatment, other than those above enumerated, are, (1) that the dilution of the sugar solution reduces the acidity of the raw sugar, and (2) prevents the action of protective colloids present in said raw sugar, such as gum, pectin, albumin, etc., and at least thirty per cent more white-liquid may be produced than is obtainable by the older methods referred to, with the same amount of raw sugar and same type of char.

In carrying out my process, one ton, for instance, of raw sugar is made into a magma with 200 lbs. (10%) of water, the same being macerated cold for about ten minutes and then spun out in a centrifugal machine to remove syrup, etc. The brown syrup thus attained is diluted to about 10° Baumé, mixed with a little diatomaceous earth heated to 160° F. and char-filtered, after which the resulting water-white liquid is used to dissolve the washed sugar crystals to a syrup of about 30° Baumé, which is then mixed with a little diatomaceous earth the whole heated to about 160° F. filtered, and passed over the bone-char, the white liquor being then grained in vacuum, the magma spun out in a centrifugal, and the granulated sugar dried and sifted to grade,—the final "run-off" of pale straw colored or golden liquid being utilized for table syrup, etc.

As co-related to the above it may be mentioned incidentally that certain green and brown colloidal coloring matters which are soluble in sugar syrup of 30° Baumé and over are caused to precipitate out of solution on dilution with water, due to the presence of protective colloids, such as albuminoids, these colloids hold the coloring matter in solution, but which on dilution thereof, are so weakened as to allow precipitation to take place. This incidental function of the diluent aids and supplements the function of the bone-char to a considerable extent, in effecting decolorization of the solution. Hence, the resultant water-white liquors attained by my process, and the elimination from the latter of remelts, run-off syrups, blackstrap, etc., involved in the older methods of refining. For the reason, also "sweet waters", i. e. those resulting from washing the char filters, filter-cloths, filter-pulp, bag filters, and empty sugar bags, may be employed to wash the raw sugar, and also to dilute the wash-liquor for first char filtration, as well as to effect the final solution and concentration without heat or evaporation of the washed sugar crystals.

The yellow or other coloring matter and colloids being usually in combination with other impurities in solution, such as bacteria, yeast, moulds, albumins, gums, pectin, polyphenols, phenol-carboxylic acids, catechol, oxidases, chlorophyll, wax, fat, essential oils, resins and mineral salts (ash), on precipitation, also carry down these interfering bodies, and this is partly the cause of the resulting pure white liquors above described.

Thus far I have herein exemplified my method of dilution of wash liquid for raw sugar as applied to the production of a clarified syrup when passed directly through the char; but my process is susceptible of further extension in that the water-white liquid thus attained may be utilized as a vehicle, without further dilution, for analogous treatment of fresh batches of raw sugar. This may be accomplished, for instance, by adding to the water-white 10° Baumé solution obtained by the passage of the diluted wash through the char in the first instance as hereinbefore set forth, a quantity of unrefined sugar sufficient to increase its density without heat or evaporation to 20° Baumé and then passing the vehicle again through the char. Furthermore, this step may be repeated by again using the resultant liquid from the second filtration as a vehicle for still another batch of unrefined sugar by adding sufficient thereof to the liquid vehicle to increase its density to, say 30° Baumé and again effecting its decolorization by passage through the char. It will be noted that in this "step up" process the density of the liquid vehicle is increased without resorting to heat or evaporation, the need of which is thus obviated. By this method of procedure the first washings of the raw sugar may be kept separate if desired.

This is the first instance in which a char-filtered sugar solution has been increased in density without heat or evaporation by the addition of unrefined or washed raw sugar, and again filtered over the char. It is to be understood, however, that the 20° Baumé solution above referred to contains no more impurities and coloring to be removed by the char than the original 10° Baumé solution, and that this also applies to and includes the final 30° Baumé solution mentioned.

Furthermore, it may be stated, that the dilute solution, after passing the char, might be concentrated in vacuum pan or by other means of evaporation. In other words, its density might be increased without the additional raw material. Also that the washed liquid may be re-used to wash a fresh batch of raw material without further dilution.

As regards the washing of the raw sugar, a modification of my process as hereinbefore set forth, may be resorted to in that the raw sugar may be placed in a centrifugal machine in sufficient amount to form a circumferential wall therein and this wall of raw material sprayed rapidly (so as not to dissolve too much sugar) with the total quantity of water required to dissolve the resultant washed sugar. This method also results in a weak solution of sugar of about 10° Baumé carrying all the impurities, which, together with a little kieselguhr, filtered and passed over char, the resultant white liquor being then used to concentrate by dissolving therein the washed sugar left in the centrifugal machine thus stepping-up the concentration without heat or evaporation, and this solution treated as aforesaid.

Still another modification of my method would be to run the raw sugar into a sieve-bottomed vat, adding all the wash water, and allowing it to rapidly seep through which would be substantially the equivalent of treatment in the centrifugal as above set forth.

In any event my process depends upon producing a weak water solution of the raw sugar containing the impurities, rendering the same water-white, and employing this weak solution to dissolve the washed sugar, in order to obtain a more concentrated solution of say 30° Baumé by stepping-up without heat or evaporation.

As a corollary of the foregoing, and in a broad sense, as implied on the first page of this specification, it will be seen that my invention consists essentially in the production of a solution sufficiently attenuated to effect the precipitation of impurities contained therein, and then segregating the precipitate and then stepping-up the density by adding raw sugar material to concentrate without heat or evaporation. Hence, if desired, the raw sugar may be washed with a sufficient quantity of water to afford a degree of attenuation of solution that will insure the precipitation of impurities derived from the raw material and then stepping-up the density by adding raw sugar material to concentrate without heat or evaporation.

The practical advantages attained by my process or refining as compared with the prior state of the art are many and obvious, involving saving in time and cost in manipulation, simplicity of apparatus, plant, etc., all calculated to materially reduce the expense of production.

What I claim as my invention and desire to secure by Letters Patent is,

1. The process herein set forth of purifying saccharine solutions consisting in first washing the raw sugar with water, diluting the washings to about 10° Baumé, filtering and passing through bone char to decolorize and adding thereto, the washed sugar to obtain a syrup of about 30° Baumé, refiltering and again decolorizing.

2. The process herein set forth of purifying saccharine solutions consisting in first washing the raw sugar with water, diluting the washings to about 10° Baumé, filtering, decolorizing and adding thereto, the washed sugar to obtain a syrup of about 30° Baumé, refiltering and again decolorizing.

3. The process herein set forth of purifying saccharine solutions consisting in first washing the raw sugar with water, diluting the washings to about 10° Baumé, decolorizing and adding thereto, the washed sugar to obtain a syrup of about 30° Baumé, and again decolorizing.

4. The step in the process herein set forth of purifying saccharine solutions consisting in washing raw sugar with cold water and diluting the same to about 10° Baumé and decolorizing.

5. The step in the process herein set forth of purifying saccharine solutions consisting in washing raw sugar with water and diluting the washings to approximately 10° Baumé to eliminate impurities, then filtering and decolorizing the same and adding thereto sufficient washed sugar to produce a final syrup of approximately 30° Baumé.

CHARLES B. DAVIS.